May 10, 1932.  A. LUND  1,857,731

WIRE STRIPPING TOOL

Filed April 21, 1931

INVENTOR
Arne Lund.
BY Arthur M. Smith
ATTORNEY

Patented May 10, 1932

1,857,731

UNITED STATES PATENT OFFICE

ARNE LUND, OF DETROIT, MICHIGAN

WIRE STRIPPING TOOL

Application filed April 21, 1931. Serial No. 531,734.

My invention relates to a wire stripping tool and particularly to a wire stripping tool for removing the insulation from electrical wiring of various kinds.

Wire stripping tools heretofore used for the purpose of removing insulation from electrical wiring have been unhandy and unsuccessful when in general use by an electrician in the wiring of a building or the like. Such tools have had no provision for the stripping of a loop in the wire and have been limited generally to a small length of wire which may be stripped by using the tool. Other of such tools require so much force by the operator that they are impractical for general use. Likewise, no provision has heretofore been made for automatically cleaning the knives used in cutting insulation after the tool is used.

It is, therefore, an object of my present invention to provide a wire stripping tool which is convenient to use and which may be used for cutting and stripping insulation of electrical wiring at any length or for stripping a loop in the wire.

These, and various other objects, features of arrangement, construction and operation, are plainly shown and described and will be best understood by reference to the accompanying drawings showing a preferred embodiment of my invention, in which Fig. 1 is a side elevation of a wire stripping tool embodying my invention;

Similar reference numerals refer to similar parts throughout the several views.

Figures 4, 5:
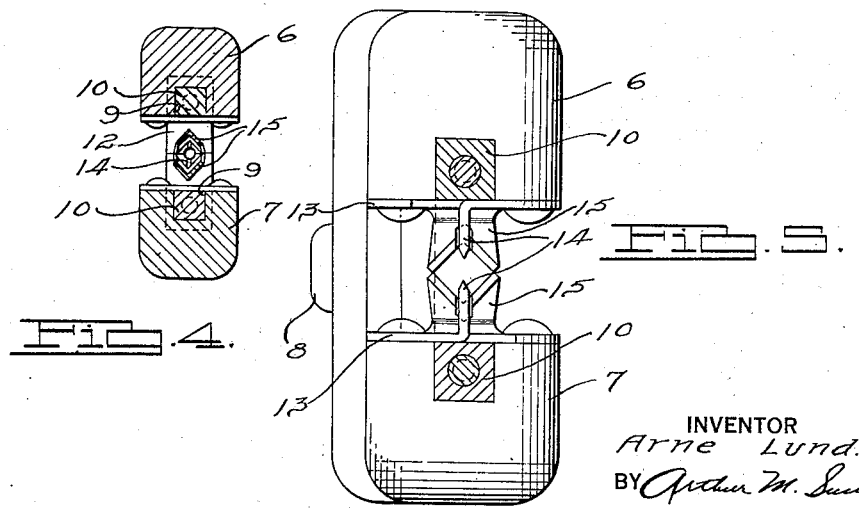
Fig. 4 is a sectional view taken on the line 4—4 of Fig. 2.
Fig. 5 is a sectional view taken on the line 5—5 of Fig. 2.

Referring more in detail to the drawings, 6 designates an upper gripping handle and 7 designates a lower gripping handle, pivotally connected by a hinge portion 8 to form the wire stripping tool of my invention. Each of the gripping handles 6 and 7 has a channel shaped groove 9 (Fig. 4) extending throughout the length of the tool. Slidably mounted in each of the grooves 9 are members 10 yieldingly held in place by springs 11 secured to the members 10 and the gripping handles 6 and 7. On the ends of each of the members 10 are knives 12, hereafter referred to as stripping knives. The knives 12 are removably secured to the members 10 by screws or similar means and may be renewed from time to time or may be replaced with knives having different sized central openings to accommodate the different sizes of wire. It is desirable that the knives 12 should scrape the wire after the insulation is removed so that it is ready for soldering without the necessity of further cleaning or scraping operations.

Adjacent the end of each of the gripping handles 6 and 7 opposite to the hinge 8 are plates 13 provided with knife portions 14, these knife portions 14 hereafter being referred to as stationary cutting knives. Also secured to each of the gripping handles are spring knife cleaning members 15, which have slotted end portions adjacent the stationary knives 14.

Figure 1:
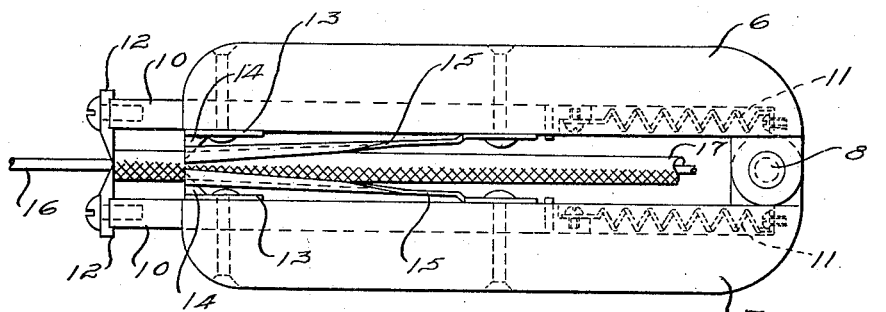

The operation of my invention is as follows: As shown in Fig. 1, a wire 16, having an insulated covering 17, is placed in the central opening between the upper gripping handle 6 and the lower gripping handle 7. Pressure is then applied to the gripping handles 6 and 7, and the stationary knives 14 and the stripping knives 12 cut through the insulation 17 to the wire 16. A pull is then exerted on the tool and the stripping knives 12 mounted on the sliding members 10 are pulled out of the handles 6 and 7. Upon continued pull on the tool the knives 14 continue to slit the insulation 17, which permits the stripping knives 12 to roll the insulation off the wire and out of the tool.

After the desired amount of wire is stripped, releasing the handles 6 and 7 removes the knives 14 and 12 from the wire and the spring cleaning members 15 remove any accumulated rubber, fabric or the like from the knives 14 so that the tool is ready for immediate use without first cleaning the tool of the accumulated matter.

By constructing my tool with a hinge on one side only of the gripping handles 6 and 7, it is possible to use this tool for stripping any desired lengths of wire or for stripping a looped wire on the looped portion.

Figure 2:
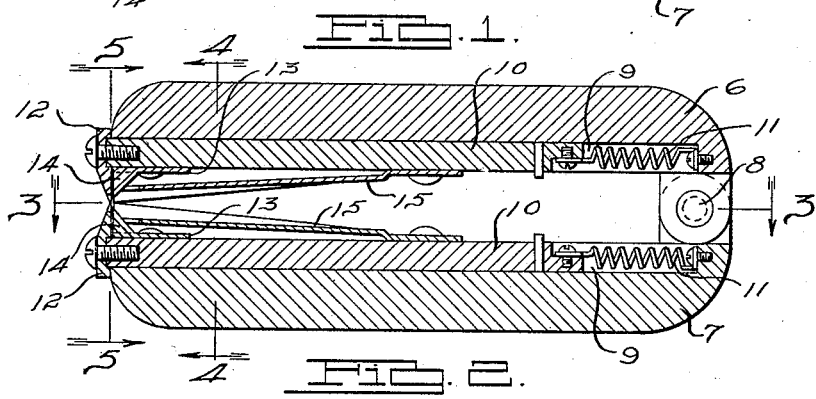
Fig. 2 is a longitudinal sectional view of a wire stripping tool embodying my invention.
Figure 3:
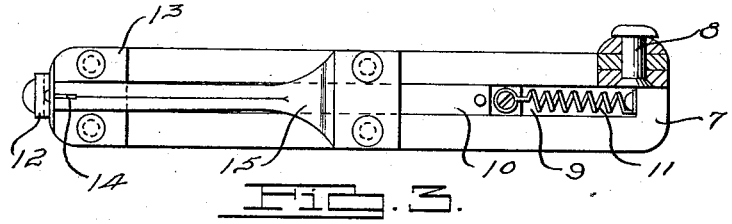
Fig. 3 is a sectional view taken on the line 3—3 of Fig. 2.

After the tool has been removed from the wire, the springs 11 cause the members 10 and movable knives 12 to assume the position shown in Fig. 2, thus making the tool small and easy to carry when not in use.

While I have illustrated a preferred embodiment of my invention, many modifications may be made without departing from the spirit of the invention, and I do not wish to be limited to the precise details of construction as herein set forth, but desire to avail myself of all changes within the scope of the appended claims.

Having thus described my invention, what I claim as new and desire to secure by Letters Patent of the United States is:

1. A wire stripping tool including a body portion having a longitudinal slot therein to accommodate the passage of wire through the tool, a plurality of fixed knives adjacent one end of said slot and adapted to slit the insulation of a wire longitudinally thereof as the tool is moved relative to such wire, and a plurality of slidable knives adjacent said stationary knives and adapted to sever the insulation on a wire at right angles to the longitudinal slitting of the insulation by said fixed knives and to be embedded therein, and means for exerting pressure on said knives and for moving said tool relative to the wire passing therethrough.

2. A wire stripping tool including a pair of pivotally connected gripping handles, a fixed knife adjacent one end of each of said gripping handles, a channel shaped slotted portion extending lengthwise of each of said gripping handles, a member slidably mounted in each of said channel shaped slotted portions, stripping knives mounted on each of said members and adjacent said fixed knives whereby said fixed knives may cut through the insulation on a wire to be stripped prior to the action of said stripping knives.

3. A wire stripping tool including a pair of pivotally connected gripping handles, a fixed knife adjacent one end of each of said gripping handles, a channel shaped slotted portion extending lengthwise of each of said gripping handles, a member slidably mounted in each of said channel shaped slotted portions, stripping knives mounted on each of said members and adjacent said fixed knives whereby said fixed knives may cut through the insulation on a wire to be stripped prior to the action of said stripping knives, and means adjacent said fixed knives for cleaning said knives.

4. A wire stripping tool including a pair of pivotally connected gripping handles, a fixed knife adjacent one end of each of said gripping handles, a channel shaped slotted portion extending lengthwise of each of said gripping handles, a member slidably mounted in each of said channel shaped slotted portions, stripping knives mounted on each of said members and adjacent said fixed knives whereby said fixed knives may cut through the insulation on a wire to be stripped prior to the action of said stripping knives, and means adjacent said fixed knives for cleaning said knives and including a spring member secured to each of said handles.

In witness whereof I hereunto subscribe my name this 20th day of April, 1931.

ARNE LUND.